(12) United States Patent
Swain et al.

(10) Patent No.: US 7,233,837 B2
(45) Date of Patent: *Jun. 19, 2007

(54) APPARATUS AND METHODS FOR PERFORMING OPERATIONS ON AN OBJECT

(75) Inventors: Matthew G. Swain, La Crescenta, CA (US); David A. Hooke, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/965,477

(22) Filed: Oct. 12, 2004

(65) Prior Publication Data

US 2005/0055127 A1 Mar. 10, 2005

Related U.S. Application Data

(63) Continuation-in-part of application No. 10/025,578, filed on Dec. 26, 2001, now Pat. No. 6,873,880.

(51) Int. Cl.
*G06F 19/00* (2006.01)

(52) U.S. Cl. .................... 700/186; 700/193; 700/176

(58) Field of Classification Search ............... 700/186, 700/176, 193, 245, 159, 178
See application file for complete search history.

(56) References Cited

U.S. PATENT DOCUMENTS

| 4,698,775 | A | * | 10/1987 | Koch et al. ............. 700/218 |
| 5,666,202 | A | * | 9/1997 | Kyrazis ................... 356/614 |
| 6,873,880 | B2 | * | 3/2005 | Hooke et al. ............ 700/159 |
| 6,898,484 | B2 | * | 5/2005 | Lemelson et al. ........ 700/245 |
| 6,980,881 | B2 | * | 12/2005 | Greenwood et al. ...... 700/193 |
| 7,065,856 | B1 | * | 6/2006 | Lemelson ................ 700/159 |

* cited by examiner

*Primary Examiner*—Leo Picard
*Assistant Examiner*—Steven R. Garland
(74) *Attorney, Agent, or Firm*—Koestner Bertani LLP; Mary Jo Bertani

(57) ABSTRACT

An apparatus for performing machining operations on an object includes a carriage, a movable head configurable with an operating attachment to perform the machining operations on the object, and a position determination system operable to determine the spatial relationship of the carriage and the object and provide a first signal representative thereof. The position determination system periodically determines the spatial relationship of the head to the object during machining operations on the object and provides a second signal representative thereof. The second signal is used to re-position the head to a desired position during the machining operations.

23 Claims, 6 Drawing Sheets

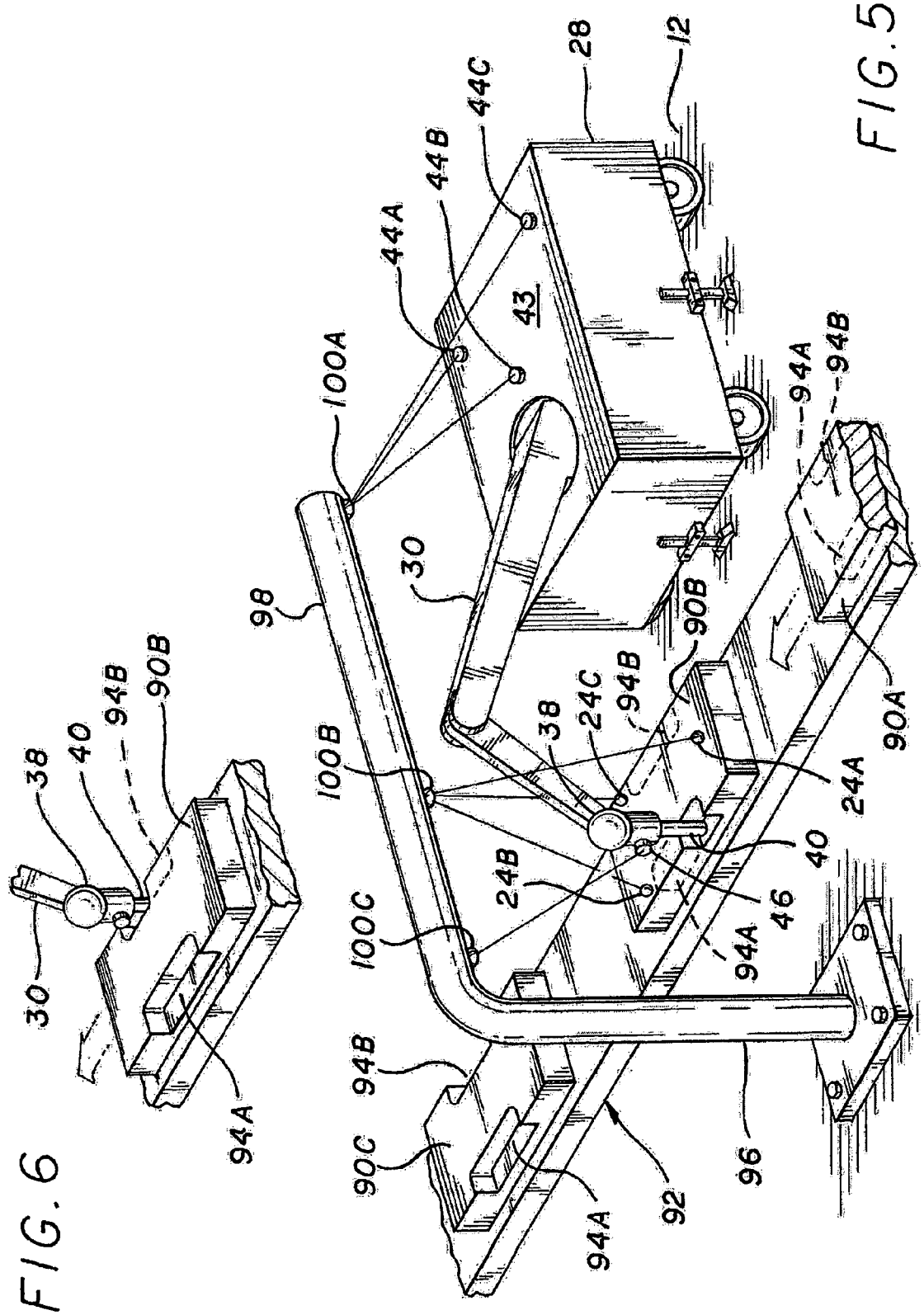

APPARATUS AND METHODS FOR PERFORMING OPERATIONS ON AN OBJECT

BACKGROUND

Generally, computer controlled milling machines and similar mechanisms consist of very rigid rails to which a movable carriage is mounted, containing a head for mounting a cutter or other operating attachment. The object to be machined is mounted on a very rigid platform and the head is moved thereover. Such machines are so rigid that the head and operating attachment can be precisely positioned under the control of a computer.

Some machines, by the nature of their design, cannot position the head and operating attachment to a precise position and thus require supplemental alignment systems.

Other apparatuses have an operating head that is mounted on a carriage located on the end of a boom. The boom pivots in a horizontal plane about an axis on spaced circular rails. A laser alignment system senses any inaccuracies in the level of the rails and adjusts the operating head accordingly. However, this system assumes that the head is always properly positioned. This is because the boom and carriage are robust assemblies and only subject to rail inaccuracies.

Positioning systems also have been devised for resurfacing and repairing rails and guideways of large heavy machinery. A monorail assembly incorporating the milling head is assembled parallel to the rail. The straightness of the rail is determined by a laser measurement system. This information is fed to a computer and is used to align the monorail with the rail. The rail can then be machined to bring it back into tolerance. However, this apparatus requires a complex set up procedure and is only adapted to machine rails. It can not be used to machine molds and the like.

SUMMARY

An apparatus for performing operations on an object is disclosed. In some embodiments, a carriage incorporating a movable head includes an operating attachment for performing operations on the object. A position determination system determines the spatial relationship of the carriage and the object, and provides a first signal representative thereof. The position determination system further determines the spatial relationship of the head to the object during actual operations on the object and provides a second signal representative thereof.

In other embodiments, a method for performing machining operations on an object includes: determining the spatial relationship between the carriage and the object and providing a second signal representative thereof; determining the actual spatial relationship between the head and object during the performance of operations and providing a third signal indicative of the actual spatial relationship there between; and adjusting the first signal based on the difference between the first signal and the second and third signals.

BRIEF DESCRIPTION OF THE DRAWINGS

Embodiments of the present invention may be better understood, and their numerous objects, features, and advantages made apparent to those skilled in the art by referencing the accompanying drawings. The use of the same reference symbols in different drawings indicates similar or identical items.

FIG. 5 is a top view of another embodiment of the apparatus of FIG. 1 operating on objects moving along a conveyor;

FIG. 6 is a view similar to FIG. 5 showing the apparatus with the conveyor having moved the object to a second position.

DETAILED DESCRIPTION

Embodiments of an apparatus discussed herein are capable of being moved to a site and operating upon an object or work piece. The position of an operating attachment on the apparatus relative to the work piece is automatically monitored to insure that the operating attachment is in the proper position relative to the work piece during operations, and to compensate for any movement of the apparatus or object.

Figure 1:
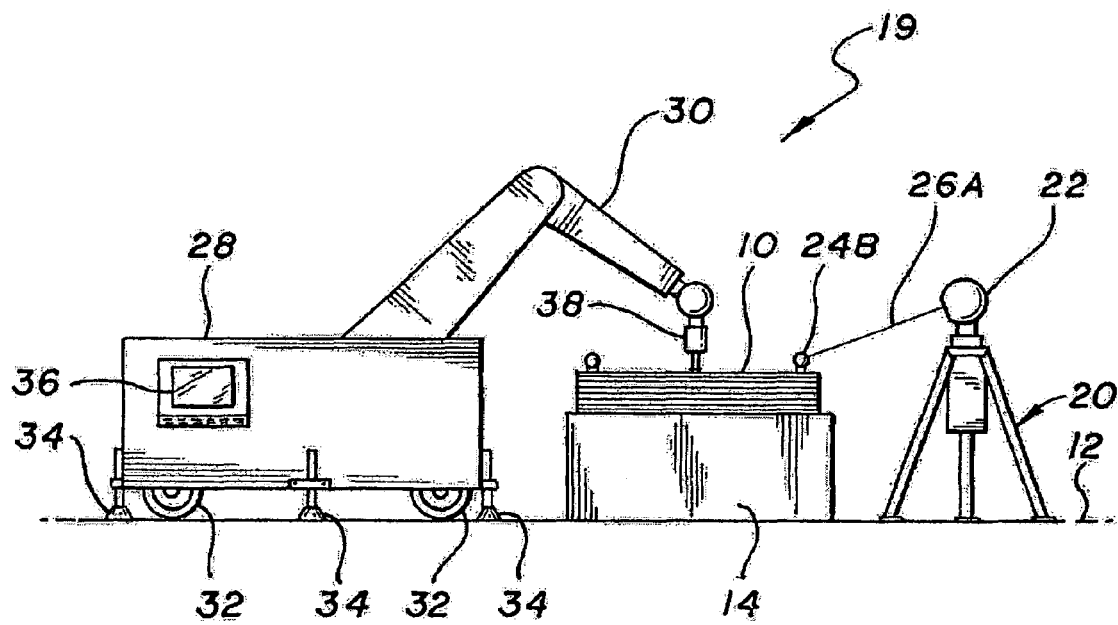
FIG. 1 is a side view of an embodiment of an apparatus for operating upon an object and an object to be operated upon.
Figure 3:
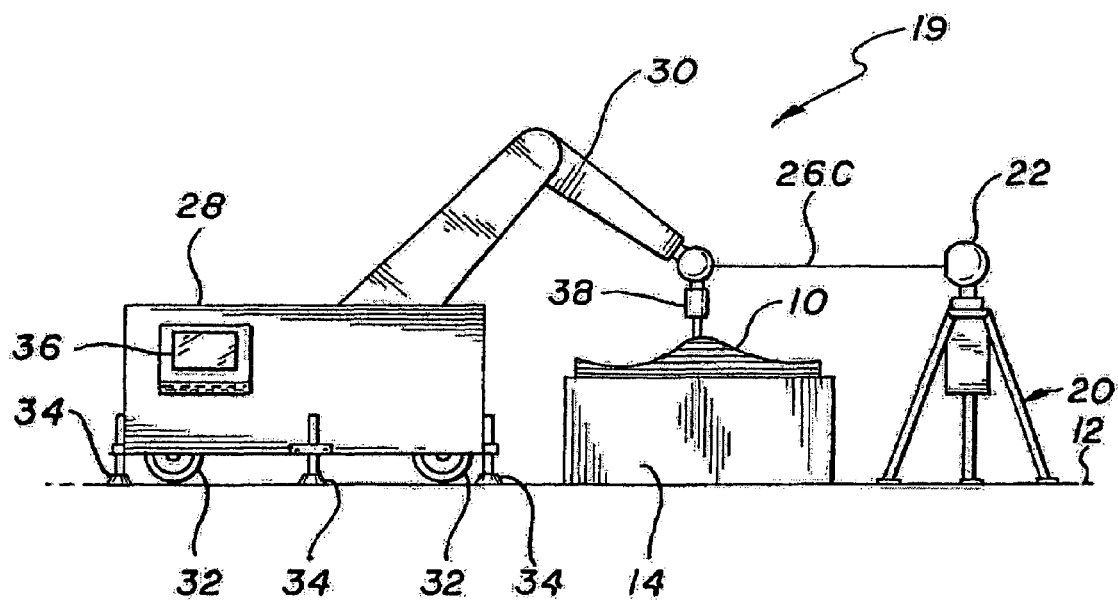
FIG. 3 is a view of the apparatus in FIG. 1 performing operations on the object.
Figure 2:
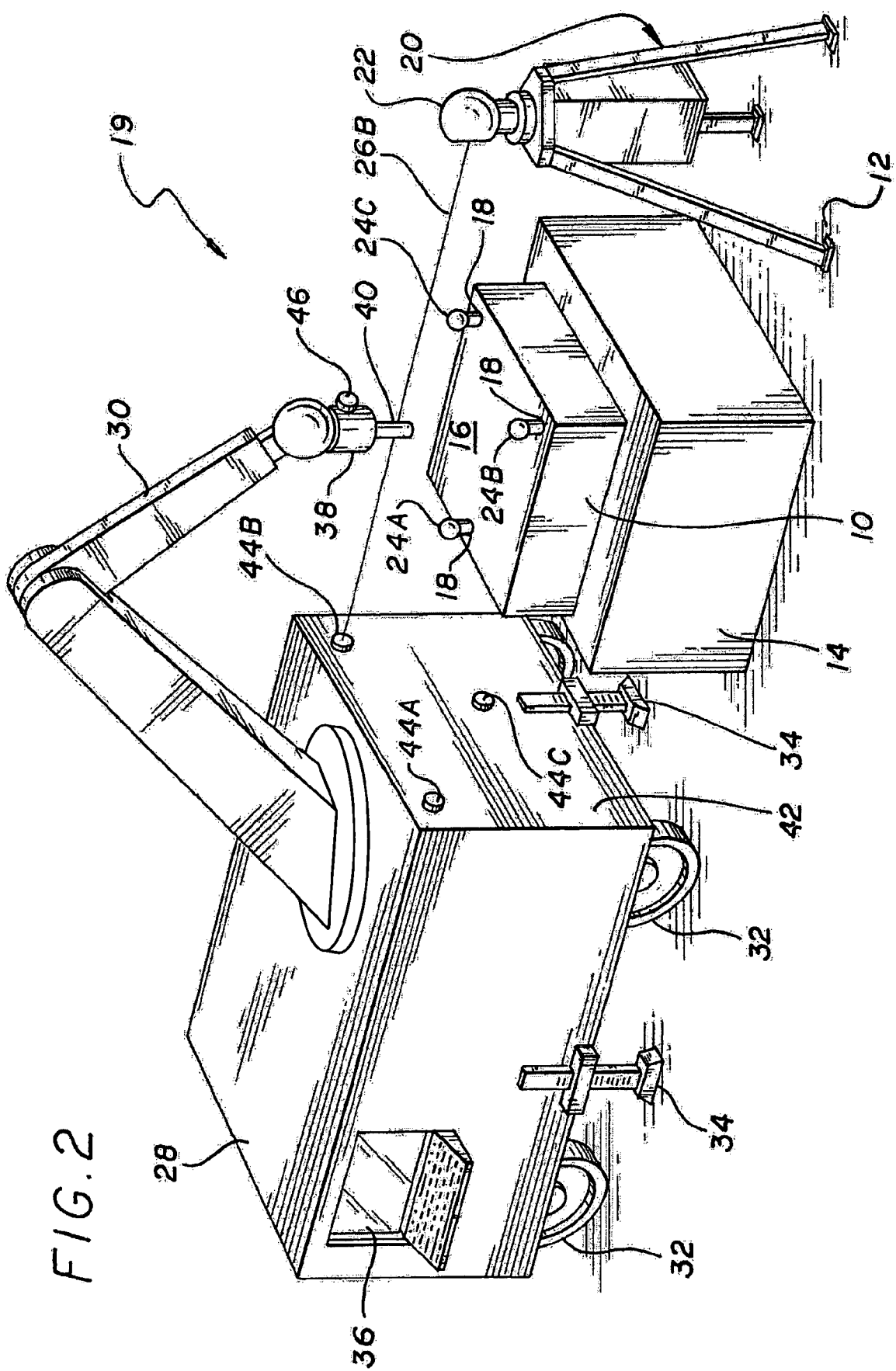
FIG. 2 is a perspective view of the apparatus of FIG. 1.

Referring to FIGS. 1–3, an object or work piece 10 to be operated upon is shown secured to floor 12 by mounting fitting 14. Object 10 can be any suitable material such as rigid foam plastic, ceramic, wood, organic, metal and/or any other type of material.

In the embodiment shown, apparatus 19 includes position determination system 20, which comprises tracker assembly 22, adapted to track the position of apparatus 19 relative to object 10 during operation, and to compensate for any movement of apparatus 19 and/or object 10. One or more attachment points 18 can be included on object 10 in a spaced relationship. One or more object targets 24A, 24B and 24C can be positioned on attachment points 18. Attachment points 18 can be any suitable structure or method for holding targets 24A–C onto object 10, including adhesives, fasteners, and/or holes in object 10 together with matching inserts on targets 24A–C.

In some embodiments, apparatus 19 further includes portable carriage 28 with robotic arm assembly 30 mounted thereon. Robotic arm assembly 30 can be configured to move in three dimensions relative to object 10. Carriage 28 can include mobility mechanism 32, position maintaining device 34, and computer 36. Mobility mechanism 32 can include wheels, rotating tracks, conveyor belts, or other means for transporting carriage 28. Jacks, wheel brakes, chocks, or other devices can be used to maintain device 34 in a desired location.

In the embodiment shown, robotic arm assembly 30 includes operating attachment head 38. An operating attachment 40 can be mounted in attachment head 38 and can be a tool such as a knife, a mechanical cutter, a drill bit, a welding tip, a laser, a heat source, or means for ablating, drilling, fusing, vaporizing or otherwise physically operating on object 10. An example of a suitable robotic arm assembly 30 is Model Number R-2000iA/200R available from Fanuc Robotics, Rochester Hills, Mich.

Front face 42 of carriage 28 can include three carriage targets 44A, 44B and 44C in a spaced relationship; although additional or fewer targets 44A–C can be utilized in other embodiments. While targets 44A–C are shown positioned on front face 42, targets can be positioned in other locations on carriage 28, such as on top surface 43. Carriage 28 can be positioned in a desired location relative to object 10 and locked in place by position maintaining device 34. The desired position of carriage 28 can be initialized in computer 36. Even if carriage 28 is set with precise hand measurements, however, the hand measurements will generally not be precise enough, thus requiring that compensation for positional error be taken into account.

Position determination system 20 can be used to determine the spatial relationship of carriage 28 to object 10 by measuring the distance between object targets 24A–C and carriage targets 44A–C. The measurements between object 10 and carriage 28 can be provided to computer 36. Computer 36 includes logic instructions that determine the spatial relationship of robotic arm 30 to object 10 based on and the distance measurements between object targets 24A–C and carriage targets 44A–C. The geometry of carriage 28 and robotic arm 30 can be pre-programmed in computer 36, or provided to computer 36 during startup initialization. Computer 36 can also include logic to calculate offsets to the spatial relationship required to compensate for the actual position of carriage 28 relative to object 10.

In some situations, carriage 28 may move and introduce inaccuracies even if locked in place by position maintaining device 34. For example, object 10 may not rest on a rigid platform. Therefore, it is possible that such movement or vibrations, even if extremely small, can cause inaccuracies in the operations. To compensate for such movement by carriage 28 and/or object 10, operating attachment target 46 can be mounted on head 38 of robotic arm assembly 30 and tracker assembly 22 can measure the distance to target 46 during actual operations. Information regarding the spatial relationship of head 38 relative to target 46 can be provided to computer 36, which can adjust the position of head 38 as often as required so that head 38 is in the desired position relative to object 10.

In some embodiments, position determination system 20 can include a first transceiver assembly (not shown) for tracking the at least one target 44A mounted on carriage 28 and a second transceiver assembly (not shown) for tracking the at least one target 24A–C mounted on object 10.

In other embodiments, position determination system 20 can include a first transceiver assembly (not shown) for tracking the at least one target 44A mounted on carriage 28; a second transceiver assembly (not shown) for tracking the at least one target 24A–C mounted on object 10; and a third transceiver assembly (not shown) for tracking the at least one target 46 mounted on head 38.

Position determination system 20 and tracking assembly 22 can utilize a variety of technologies to transmit and receive signals, such as a laser transceiver, a Global Positioning System (GPS), a radio frequency identification (RFID) system, and/or a radio direction finding system (RDFS). Signals utilized by position determination system 20 can be any suitable frequency and format, ranging from radio to ultraviolet frequencies. Components in position determination system 20 can be configured to handle digital and/or analog data. Position determination system 20 can be included on carriage 28 or external to carriage 28 as shown in FIGS. 1–3.

A transmitter device can be utilized by tracking assembly 22 to transmit signals 26 to targets 24A–C, 44A–C, and 46, and configured to determine the locations of the sources of received signals. In some embodiments, the transmitter device can include a broadcast antenna, transmitter, encoder, and a processor with memory. Other transmitter devices can include fewer components or additional components, depending on the functions to be performed and the distribution of functions among the components.

In some embodiments, tracker assembly 22 transmits a signal, indicated by numeral 26 to targets 24A–C mounted on object 10, targets 44A–44C mounted on carriage 28, and target 46 mounted on head 38. Signal 26 can be reflected back to tracker assembly 22 and/or detected by a receiver (not shown) located in carriage 28, object 10, and/or head 38.

Tracker assembly 22 can include a transceiver that includes interferometers that interferes the source signal with the signal that has traveled twice between tracker assembly 22 and targets 24A–C, targets 44A–44C, and/or target 46 in order to measure the direction and distance between the targets 24A–C, 44A–44C, and/or 46. By measuring the directions of the signals 26 relative to targets 24A–C, 44A–44C, and/or 46, the location and orientation of targets 24A–C, 44A–44C, and/or 46 in spatial coordinates can be determined. The measurements can be provided to tracking computer 36, which can calculate the position of object 10 relative to carriage 28 and/or head 38. Note that additional or fewer targets 24A–C, 44A–44C, and/or 46 can be utilized in other embodiments.

Computer 36 can be coupled to receive data from one or more devices that are capable of receiving signals at the desired frequencies including, for example, Global Positioning System (GPS) signals, Radio Frequency Identification (RFID) signals, laser measurement system signals, and/or radio direction finding (RDF) signals, among others. The receiver devices can be included in position determination system 20 and/or at targets 24A–C, 44A–44C, and/or 46. The receiver devices can be configured to receive signals from one or more antennas, tune the desired frequency(s), and detect/demodulate the information in the desired signals(s). The receiver devices can also include a decoder that deserializes the received data, and provides the received data to computer 36 in a suitable format for further processing.

GPS receivers are commonly used to determine the geographic position of a stationary or moving object, such as object 10, utilizing signals transmitted from GPS satellites. GPS signals typically provide information regarding the object's latitude, longitude, and altitude.

RFID systems use radio frequency signals to provide information regarding the identity, location, and other characterizing information about object 10. In a RFID system, a RFID tag such as a bar code or RFID transmitter can be attached to object 10 to provide any suitable information, such as location, an identification number, inventory part number, serial number, model number, and other suitable information. A RFID tag reader, such as bar code scanning device or RFID receiver, can be located on attachment head 38 or other suitable location, and configured to gather information available from the RFID tag. The RFID information can be supplied to computer 36, which can include logic instructions to process the RFID information in an inventory control system, a scheduling system, or other desired processing instructions. One or more RFID tags can be positioned on object 10 in addition to, or instead of, targets 24A–C and used by position determination system 20 to determine the spatial relationship between carriage 28 to object 10.

Radio direction finder (RDF) receiver systems can be used to indicate the angle of arrival of an incoming radio frequency wave front for the purpose of locating the source of the transmission. Two or more RDF systems may be used to locate the transmission source by triangulation.

Referring to FIGS. 1–4, FIGS. 4A and 4B show flow charts of an embodiment of an operating process that can be utilized with apparatus 19. The flow chart as shown includes Set up Section 50; Reprocessing Section 52; In-Situ Processing Section 54; and Post Processing Section 56.

Set up Section 50 can include determining the positions of object 10 and carriage 28. Process 60 can set up cart or carriage 28 and position determination system 20 in proximity to object 10. Mobility mechanism 32 can move carriage 28 to a predetermined position relative to object 10. Alternatively, a user of apparatus 19 can position object 10 at such a predetermined position during set-up. Carriage 28 can be moved into position in proximity to object 10. Once in position, position maintaining device 34 can be engaged so that at least some part of the weight of carriage 28 is borne by device 34. Note that carriage 28 may not need to be level or in a particular orientation.

Process 62 can determine the spatial relationship of object 10 to robotic arm assembly 30 of carriage 28 and provide the information to computer 36 via a first signal. Position determination system 20 can send signals 26 to object targets 24A–C to determine the spatial coordinates of object 10. Computer 36 can compare the coordinates of object 10 to the coordinates of carriage 28 and head 38 or robotic arm assembly 30. Position determination system 20 can be used to determine the position of object 10 and carriage 28. The data on the coordinates of both object 10 and carriage 28 can be used to update the logic instructions executed by computer 36 before and during machining operations on object 10.

Pre-Processing Section 52 can include processing the positional information and up-dating the instructions in computer 36. Process 64 can include storing positional information from the first signal in computer 36. Data storage and retrieval can be implemented using any suitable storage devices and protocols, such as such as the NASA/NBS Standard Reference Model for Telerobot Control System Architecture (NASREM).

The position information can be stored in computer 36 and used to generate a coordinate transformation matrix T that can be applied to adjust robotic arm 30 to operate upon object 10. Process 66 can include generating a coordinate transformation matrix (T) that can be used to reference all location data to the same coordinate system. Computer 36 can include specialized digital signal processing hardware such as the Motorola DSP56000 series to perform matrix computations. Any suitable logic instruction for performing coordinate transformations can be utilized, such as, for example, PV-WAVE by Visual Numerics, Inc.

Process 68 can include using the transformation matrix to update the spatial coordinates of targets 24A–C to computer 36. The use of transformation matrix T allows operating attachment 40 to be moved to any position necessary to perform the machining operations on object 10.

In-Situ Processing section 54 can include operating on object 10, with tracker assembly 22 providing position information to correct positional errors between carriage 28, head 38, and object 10. Prior to operations, tracker assembly 22 can focus on target 46 on head 38 of robotic arm 30 and enter a feedback tracking mode. The position of robotic arm 30 can be driven by logic instructions that incorporate the actual positions of carriage 28 and object 10. However, tracker assembly 22 can receive real-time head 38 spatial relationship information. If there is a deviation between carriage 28, head 38, and/or object 10, the logic instructions can determine a difference or offset matrix to re-position head 38 to the desired position. The process of re-positioning head 38 can be updated several times a second, insuring a smooth operation. Additionally, apparatus 19 can be repositioned by mobility mechanism 32 or by a user of apparatus 19.

In Process 70, tracker assembly 22 tracks head target 46. Position determination system 20 can monitor the spatial position of head 38 by transmitting signals 26 to head target 46, and receiving return signals that can be decoded to determine the position of head 38.

Process 72 can include performing machining operations based on the spatial relationship between carriage 28 and object 10. The position of object 10 is monitored by position determination system 20 during the operations. Any suitable machining or other type of operation can be performed. The operation can be controlled manually or by logic instructions that are executed by computer 36.

Process 73 can include determining whether position of head 38 is in proper position in relation to object 10 during machining operations. A second signal from position determination system 20 can be used to indicate the actual spatial relationship between object 10 and head 38.

Process 75 can include branching to correct the position of head 38 if head 38 is not in proper position. To determine if head 38 is at proper position, logic instructions in computer 36 can determine deviations between actual and desired positions of head 38. The spatial coordinates of target 46 on head 38 can be compared to previously calculated coordinates. If head 38 is at the proper position, continue to Process 76.

Process 76 can include determining whether the machining operation is complete using one or more techniques such as monitoring the rotational rate of operating attachment 40, monitoring the elapsed time of processing, utilizing a weight cell (not shown) located in mounting fitting 14 to monitor reduction of material, evaluating the position of the tip of operating attachment 40 with respect to operating attachment target 46, evaluating the number of rotations of head 38 in certain operations, or other method appropriate to the type of operation. If the machining operation is complete, then process 76 can continue to Process 78 of Post Processing Section 56. If operation is not complete, then continue to Process 80.

Process 80 can include generating a delta transformation matrix and calculating offsets to correct the position of head 38 with respect to object 10. A third signal representing the desired position of head 38 can be provided to robotic arm 30 to continue operating on object 10 in Process 72.

Post Processing section 56 can include inspecting object 10 using robotic arm 30 after the machining operation. Process 78 can include replacing operating attachment 40 with an inspection target (not shown) for use in calibration or inspection operations. Alternatively, the user of apparatus 19 can replace operating attachment 40 with a measurement attachment (not shown). Tracker assembly 22 can track the position of the inspection target as the machined object 10 is probed in Process 82.

In Process 84, computer 36 can be used to store the coordinates of the measurements. Process 86 can include comparing measured data with desired configuration for object 10. Additional logic instructions in computer 36 can compare actual results to pre-programmed expected results. If the results of the inspection are not within tolerance, return to Process 80. Otherwise, the machining operation is complete.

Processes 50–56 can be encoded as a computer product including base instructions implemented in software/hardware/firmware, or a combination of software, hardware, and/or firmware. Software implementing logic instructions can be distributed via portable optical or magnetic recording media, as well as downloaded or accessed via a network (such as the Internet).

Referring to FIGS. 5 and 6, objects 90A, 90B and 90C are shown mounted on conveyor system 92. Two slots 94A and 94B shown on completed object 90C, partially formed on object 90B and in dotted lines on object 90A. Carriage 28' is similar to carriage 28 except targets 44A, 44B and 44C are mounted on top surface 43. Operating attachment 40 mounted in head 38 of robotic arm 30 is shown operating upon slot 94A in object 90B. In FIG. 6, object 90B, which has moved further down conveyor system 92 and apparatus 19 has created slot 94A and has started to create slot 94B. Support column 96 extends from floor 12, and includes horizontal arm 98 extending over a portion of conveyor system 92 and carriage 28'. Tracking assemblies 100A, 100B, and 100C can be mounted on arm 98 or other suitable location to track carriage targets 44A–44C, 24A–24C, and 46. The spatial relationships of object 10 and head 38 can be tracked as conveyor system 92 moves objects 90A, 90B and 90C. When the position of head 38 is monitored, the position of carriage 28' typically does not need to be monitored during the operations. Tracking assembly 100C can be used to initially locate carriage 28' and to monitor the position of head 38.

Figure 4A:
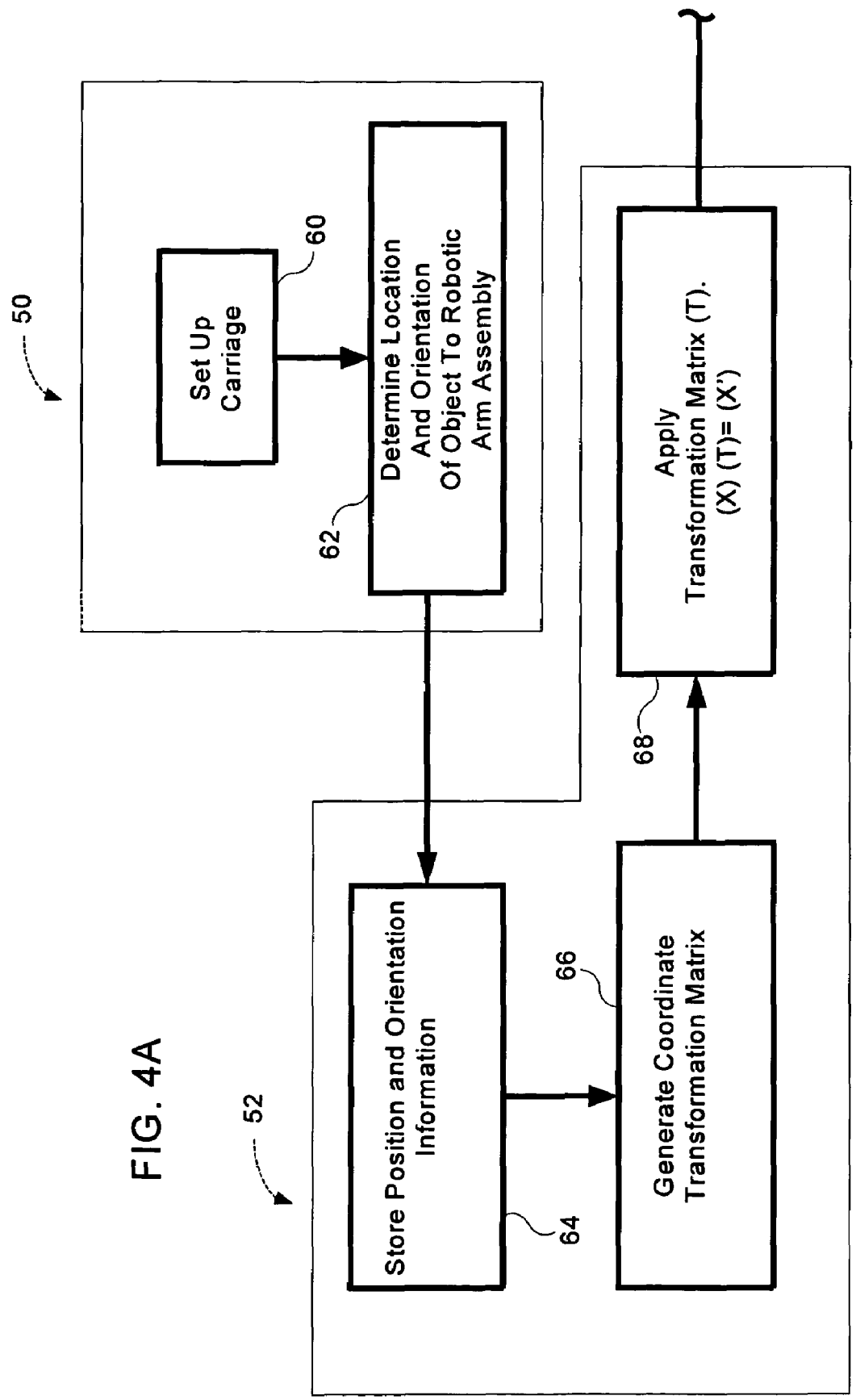
FIGS. 4A and 4B show a flow diagram of an embodiment of a process for controlling the apparatus of FIG. 1.
Figure 4B:
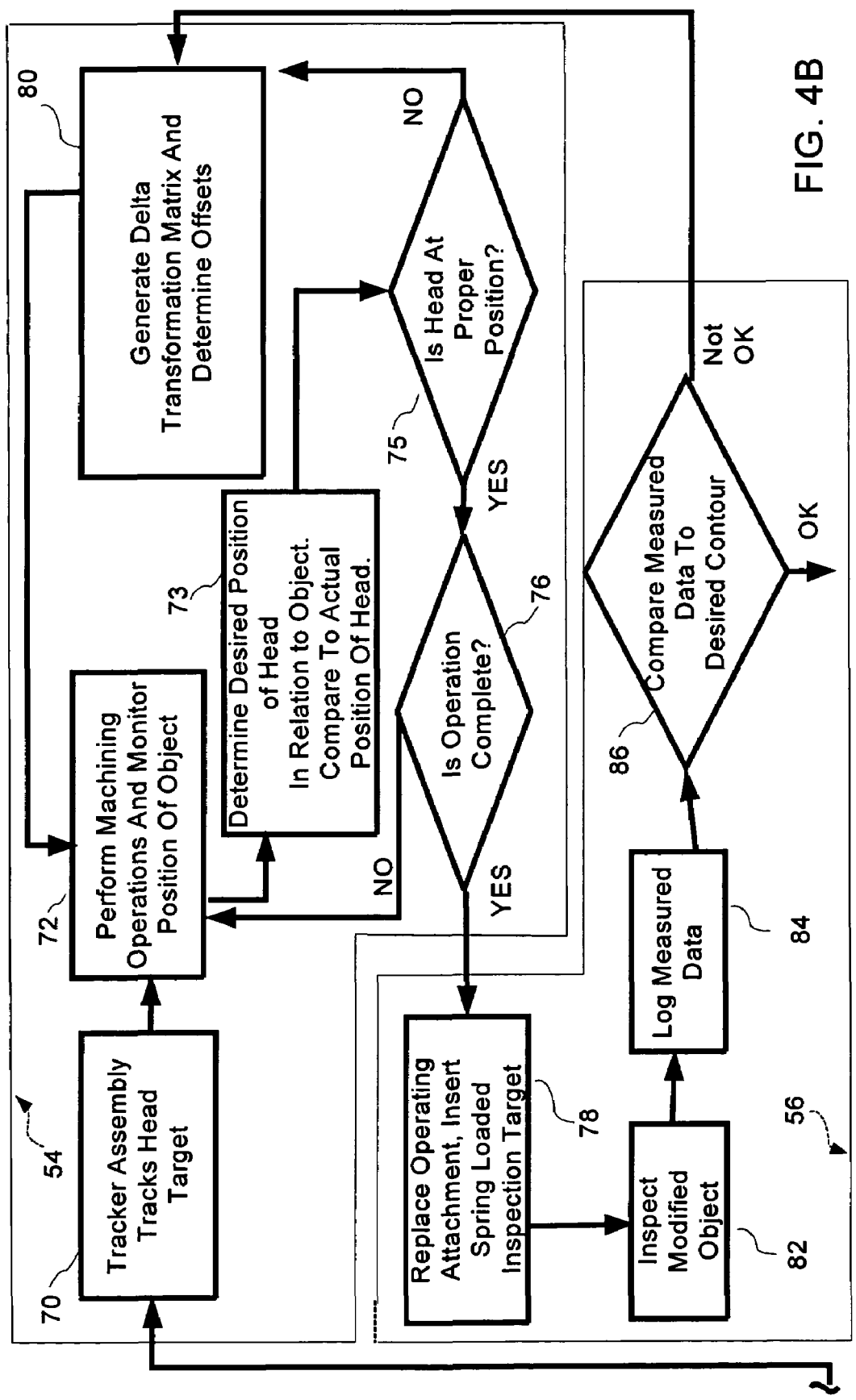
Figure 7:
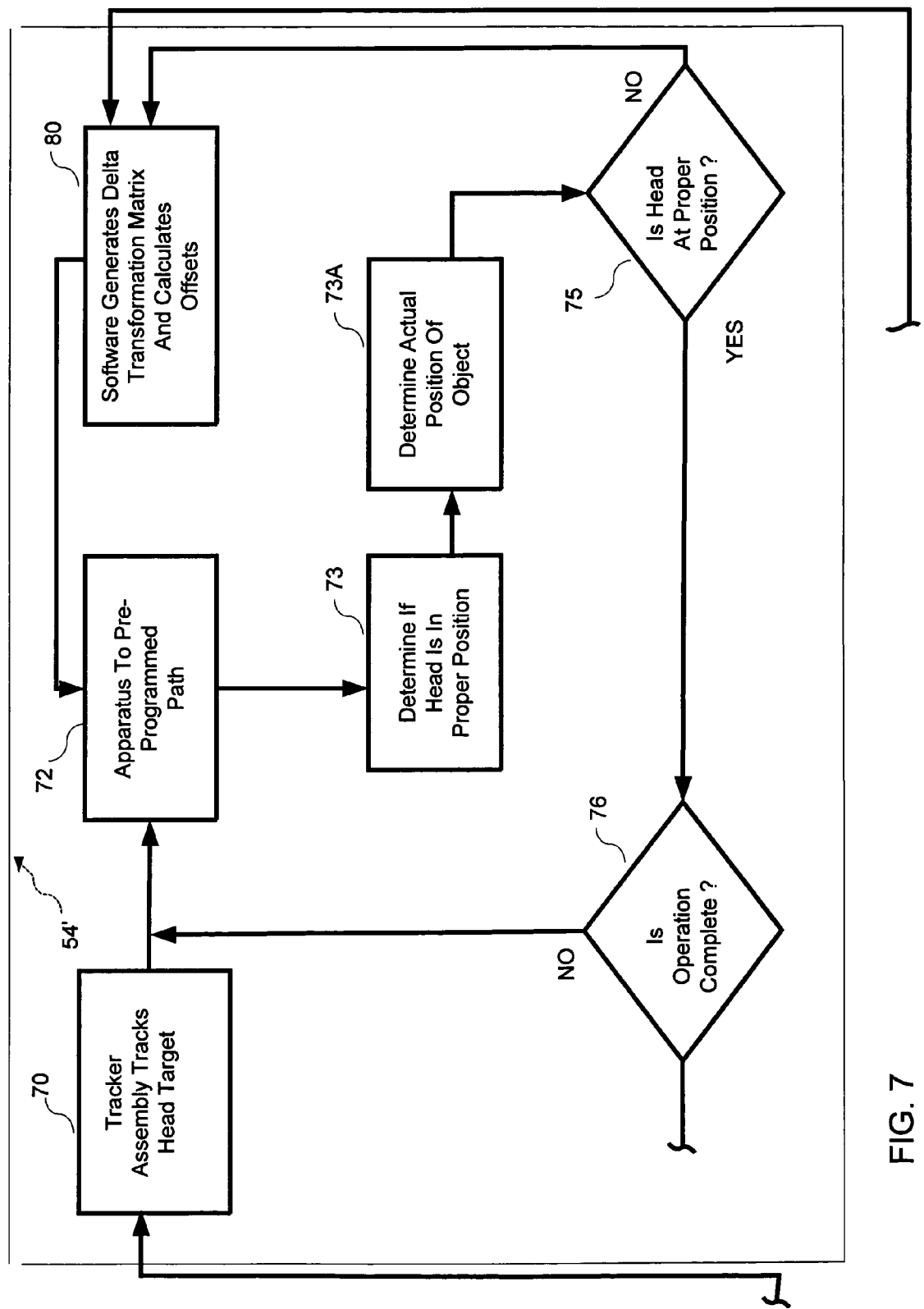
FIG. 7 is a portion of FIG. 4B showing a revised In-Situ Processing Process.

Referring to FIG. 7, a process 54' similar to process 54 disclosed in FIG. 4B is shown. Process 73A includes determining the position of object 90. In Process 73A, tracker assembly 100B tracks object targets 24A, B and C to determine if object 90 has moved from a desired position. If object 90 has moved, then the position of head 38 can be adjusted to adapt to the new position of object 90.

Various embodiments of the apparatus 19 can be used to accurately perform operations on object 10. In one embodiment, apparatus 19 can accommodate inadvertent movement between object 10 and carriage 28. In other embodiments, apparatus 19 can accommodate continuous movement between carriage 28 and object 10. Furthermore, while a conveyor system was shown for purposes of illustration, a basically stationary object 10, subject to vibrations and small movements, can be accommodated.

Logic instructions can be stored on a computer readable medium, or accessed in the form of electronic signals. The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many modifications, additions and improvements of the described embodiments are possible. For example, those having ordinary skill in the art will readily implement the structures and methods disclosed herein, and will understand that any process parameters, materials, and dimensions are given by way of example only. The parameters, materials, and dimensions can be varied to achieve the desired structure as well as modifications which are within the scope of the claims. Variations and modifications of the embodiments disclosed herein may also be made while remaining within the scope of the following claims. In the claims, unless otherwise indicated, the article "a" is to refer to "one or more than one."

What is claimed:

1. An apparatus for performing machining operations on an object comprising:
    a carriage;
    a movable head configurable with an operating attachment to perform the machining operations on the object; and
    a position determination system operable to determine a spatial coordinates of the object during the machining operations, determine a spatial relationship between the carriage and the object and provide a first signal representative thereof, and to further periodically determine a spatial relationship of the head to the object during machining operations on the object and to provide a second signal representative thereof, wherein the second signal is used to re-position the head to a desired position during the machining operations.

2. The apparatus as set forth in claim 1, further comprising a computer processor operable to:
    receive the first and second signals,
    provide a third signal to the movable head based on the spatial relationship between the carriage and the object, and
    adjust the third signal based on the spatial relationship between the carriage and the object, and the head and the object.

3. The apparatus as set forth in claim 1, further comprising a robotic arm mounted on the carriage, and a movable head mounted on the robotic arm.

4. The apparatus as set forth in claim 1, wherein the carriage is portable.

5. The apparatus as set forth in claim 4 wherein the carriage includes a mechanical system operable to lock the apparatus in a position in proximity to the object.

6. The apparatus as set forth in claim 1, wherein the position determination system includes:
    a tracking system;
    at least one first target mounted on the carriage;
    at least one second target mounted on the object; and
    at least one third target mounted on the head.

7. The apparatus as set forth in claim 6, further comprising logic instructions operable to: receive the first and second signals,
    provide a third signal to the movable head based on the spatial relationship between the carriage and the object, and
    adjust the third signal based on the spatial relationship between the carriage and the object, and the head and the object.

8. The apparatus as set forth in claim 1, wherein the position determination system includes a Global Positioning System (GPS).

9. The apparatus as set forth in claim 1, wherein the position determination system includes a radio frequency identification (RFID) system.

10. The apparatus as set forth in claim 1, wherein the position determination system includes a radio direction finding system (RDFS).

11. The apparatus as set forth in claim 1, wherein the position determination system includes a laser measurement system.

12. The apparatus as set forth in claim 1 wherein the position determination system comprises:
   a first transceiver assembly operable to track a first target mounted on the carriage; and
   a second transceiver assembly operable to track a second target mounted on the object.

13. The apparatus as set forth in claim 12 wherein the position determination system comprises:
   a first transceiver assembly for tracking the first target;
   a second transceiver assembly for tracking the second target; and
   a third transceiver assembly for tracking a third target mounted on the head.

14. The apparatus as set forth in claim 1, wherein the head is configurable to detect information from a tag on the object, and to supply the detected information to at least one of an inventory tracking system, a scheduling system, and the position determination system.

15. The apparatus as set forth in claim 1, wherein the head is configurable to inspect the object, and information from inspection of the object is used to determine whether the machining operations are complete.

16. A system comprising:
   a carriage including a movable head for performing machining operations on an object;
   a position determination system operable to determine a spatial relationship between the carriage and the object, and provide a first signal representative thereof, and to continuously determine a spatial relationship of the head to the object during actual operations and provide a second signal indicative thereof; and
   computerized logic instructions operable to provide signals to move the head to specific spatial relationships with the object.

17. The system as set forth in claim 16 wherein the carriage is portable, the system further comprising a lock to maintain the carriage in a desired position in relation to the object.

18. The method as set forth in claim 17, further comprising:
   determining a spatial relationship between the carriage and the object during operations and providing a third signal representative thereof; and
   adjusting the first signal based on the difference between the first and third signals such that the head remains in the computed spatial relationship to the object.

19. The method as set forth in claim 17, further comprising inspecting the object to determine whether the machining operations are complete and repeating machining operations until the object passes inspection.

20. The method as set forth in claim 17, further comprising detecting information from a tag on the object, and supplying the detected information to at least one of an inventory tracking system and a scheduling system.

21. The system as set forth in claim 16 wherein the position determination system includes:
   a tracking system;
   at least one target mounted on the head; and at least one target mounted on the object.

22. The system as set forth in claim 16 wherein the position determination system includes at least one of a Global Positioning System (GPS), a radio frequency identification (RFID), a radio direction finding system (RDFS), and a laser measurement system.

23. A method of performing machining operations on an object comprising:
   determining a spatial relationship between a carriage and the object and providing a first signal representative thereof;
   determining a spatial relationship between a head and the object periodically during the machining operations and providing a second signal indicative of the actual spatial relationship there between, wherein the head is mounted on the carriage; and
   adjusting position of the head periodically before and during the machining operations based on difference between the first and second signal.

* * * * *